(No Model.)

A. B. CARTER.
WHEEL AND AXLE COUPLING.

No. 324,653. Patented Aug. 18, 1885.

Witnesses
B. J. Noyes
W. H. Sigston

Inventor
Alba B. Carter
by Crosby & Gregory
Att'ys.

UNITED STATES PATENT OFFICE.

ALBA BRIGGS CARTER, OF GREAT FALLS, NEW HAMPSHIRE, ASSIGNOR TO THE EUREKA AXLE COMPANY, OF PORTLAND, MAINE.

WHEEL-AND-AXLE COUPLING.

SPECIFICATION forming part of Letters Patent No. 324,653, dated August 18, 1885.

Application filed October 23, 1884. (No model.)

*To all whom it may concern:*

Be it known that I, ALBA BRIGGS CARTER, of Great Falls, county of Strafford, State of New Hampshire, have invented an Improvement in Wheel-and-Axle Couplings, of which the following description, in connection with the accompanying drawings, is a specification, like letters on the drawings representing like parts.

My invention relates to a coupling device for fastening a wheel upon an axle, and is intended as an improvement on the device shown in Letters Patent No. 301,478, granted to me July 8, 1884. In the said patent the arm or bearing portion for the axle is provided with a circumferential groove, and the hub of the wheel is provided with a screw having a cup-shaped recess, in which is seated a ball which projects from the said recess into the groove of the axle, and thereby prevents longitudinal movement of the hub on the axle. The said ball revolves around the axle with the wheel, being carried around by the screw in the hub, and at the same time is free to rotate on any axis, so as to produce but little friction in the groove. In the said patent the screw has an attached turning and locking device, by which it may be rotated to effect the removal of the ball from the groove in the axle, so that the wheel may be removed therefrom, or by which the screw may be turned to carry the ball into the said groove and adjust the position of the ball with relation thereto, and when properly adjusted the screw may be locked by the said device so as not to turn in either direction.

In the present invention the axle is grooved, and the hub is provided with an engaging device to enter the said groove, and a screw for holding the said engaging device in proper position in the groove, or for enabling it to be removed therefrom when the wheel is to be removed from the axle, and in combination with the said holding-screw a locking-screw is employed, preferably having a thread of opposite inclination, the said locking-screw bearing on the head of the holding-screw for the engaging device and preventing the rotation thereof.

Figure 1:
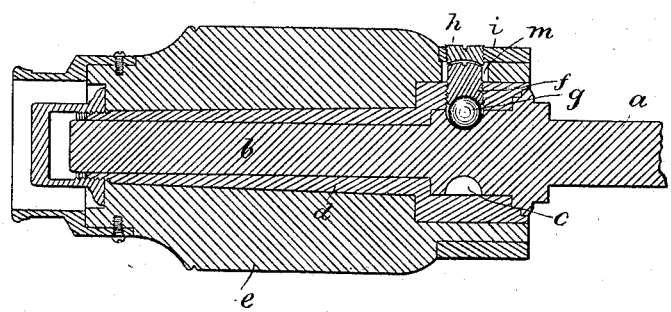
Figure 2:
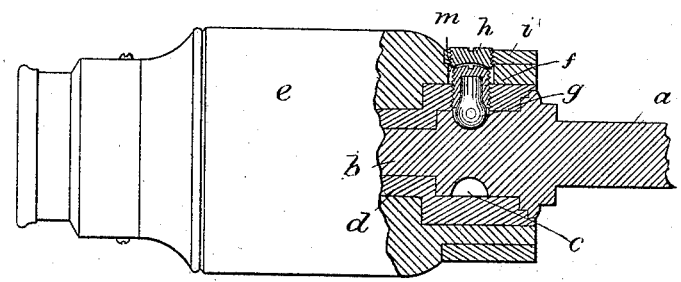
Figure 3:
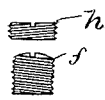

Figure 1 is a longitudinal section of a wheel and axle provided with a coupling device embodying this invention; Fig. 2, a partial section showing a modified form of engaging device for entering the groove of the axle, and Fig. 3 a detail showing the two screws in side elevation.

The axle $a$ has its arm or bearing portion $b$ provided with a circumferential groove, $c$, (shown in this instance as made in an enlarged portion of the arm,) near its junction with the axle $a$.

The box or bearing-sleeve $d$ of the hub $e$ is provided with a threaded passage to receive a screw, $f$, adapted to hold the axle-engaging device $g$, causing the same to revolve with the hub around the axle. The said engaging device $g$ is free to rotate or turn independently of the screw $f$, as it bears against either side of the groove $c$ in the revolution about the axle, thus producing but little friction in the said groove.

When desired to remove the wheel from the axle, the screw $f$, which is preferably right-hand threaded, may be turned in its passage so as to move outward from the axle, and by turning the wheel so that the said screw is below the axle the engaging device $g$ will follow the said screw, under the action of gravity, until it is wholly removed from the groove $c$, when the wheel may be withdrawn from the axle.

In fastening the wheel upon the axle it is applied while the screw $f$ is thus withdrawn, and when the engaging device $g$ is opposite the groove $c$ the screw $f$ is again turned inward, carrying the said engaging device $g$ into the groove, it being properly adjusted by turning the screw one way or the other until the engaging device just touches in the groove without pressure. When thus adjusted, the screw $f$ is locked and prevented from further movement by a locking-screw, $h$, the thread of which is preferably inclined in the opposite direction to that of the screw $f$, as clearly shown in Fig. 3. The locking-screw $h$, as shown in this instance, enters a threaded passage in the band or ring $i$ surrounding the end of the hub. A sufficient space is left, as shown at $m$, between the threaded passages of the screws $f$ $h$ to permit the screw $f$ to be withdrawn, after the removal of the screw $h$, a sufficient distance to allow the engaging device $g$ to be removed from the groove $c$, and the upper portion of the screw $f$ is reduced in diameter so as to enter the passage of the screw $h$ without engaging the threads thereon in the outward movement of the said screw $f$, or the latter may be made shorter, and the screw $h$ of sufficient length to engage it when screwed in to engage the device $g$ with the groove $c$. The passage for the screw $h$ may be larger than that for the screw $f$, so that the said screw $f$ may pass freely through the said passage of the screw $h$ in turning outward or inward, as shown in Fig. 2. When the screw $f$ is too large to pass through the passage of the screw $h$, it is inserted in its own passage from the interior of the hub-sleeve before the latter is applied to the axle.

It is obvious that it is not necessary that the screws $f$ and $h$ should have threads of opposite inclination. The threads may be inclined in the same direction, but of different pitch, or the screw $h$ may be otherwise adapted to bear on the screw $f$, locking both of the screws until positively turned by a suitable instrument.

As shown in Fig. 1, the said engaging device consists of a ball seated in a cup-shaped cavity in the screw $f$, and in Fig. 2 the said engaging device is provided with a shank or stem entering a tubular passage in the said screw.

The invention is not limited to the precise form of the engaging device which enters the groove of the axle and its holding-screw in the hub, and the said engaging device may be variously formed without departing from the main features of the invention—as, for instance, in another application of even date herewith I have shown and specifically claimed other forms of engaging devices in combination with a grooved axle and holding screw in the hub, the engaging devices in the said other application being connected with the holding-screw, instead of merely seated in a cup or recess therein.

I claim—

1. The combination of the hub and grooved axle with the engaging device adapted to revolve and rotate in the groove of the axle, a screw whereby the said engaging device is held in position in the hub, and a locking-screw co-operating therewith, substantially as described.

2. The combination of the hub and grooved axle with the engaging device $g$, its holding-screw $f$ in the hub, and the locking-screw $h$, of opposite hand, substantially as described.

3. The combination of a hub and grooved axle with the engaging device $g$, its holding-screw $f$, the locking-screw $h$ therefor, and the threaded passages for the said screws $f$ and $h$, adapted to permit the said holding-screw to be screwed away from the axle a sufficient distance to enable the engaging device $g$ to be removed from the groove of the axle, substantially as and for the purpose described.

In testimony whereof I have signed my name to this specification in the presence of two subscribing witnesses.

ALBA BRIGGS CARTER.

Witnesses:
CHARLES H. FAUNCE,
JACOB B. STEVENS.